United States Patent Office 3,136,648
Patented June 9, 1964

3,136,648
MODIFIED HYDROUS METAL OXIDE PIGMENTS
AND THE PREPARATION THEREOF
Julius Jackson, Westfield, N.J., assignor to E. I. du Pont de Nemours and Company, Wilmington, Del., a corporation of Delaware
No Drawing. Filed Oct. 29, 1962, Ser. No. 233,883
13 Claims. (Cl. 106—302)

This invention relates to modified hydrous iron (III) oxide pigments and to modified hydrous chromium (III) oxide pigments.

A pleasing and distinctive decorative effect is obtained when colored pigments of relatively high transparency are combined with metal flakes, such as aluminum flakes, in coating compositions. As an example of such transparent pigments and coating compositions which give this distinctive decorative effect, attention is directed to my U.S. Pat. 2,818,348. This patent describes a modified iron oxide pigment prepared by precipitating hydrous iron (III) oxide, heating the oxide with a petroleum sulfonic acid or salt, and then flocculating the highly dispersed pigment with a water soluble salt of an organic cationic agent. The flocculated product is then recovered by filtering, washing, and drying, and there is obtained a dry pigment of excellent transparency, durability, and color intensity. However, the color of such pigments is limited to the reddish brown and yellows. Attempts to extend the color to the greenish range by replacement of the hydrous iron (III) oxide wholly or in part with hydrous chromium (III) oxide results in a pigment of extremely low color value lacking in the color intensity desirable in many metallic finishes. Another U.S. patent which describes transparent color pigments is 2,575,347. The pigments prepared according to this patent are also modified iron oxides and vary in color from a transparent gold to a rich transparent deep maroon, but they do not extend into the blue-green color range.

This application is a continuation-in-part of my application Serial No. 119,833, filed June 27, 1961, and now abandoned.

It is also well known to prepare transparent pigmented coating compositions by flushing freshly precipitated hydrous oxides of high degree of transparency into a coating composition vehicle. The finishes prepared in this way may possess a high degree of transparency but the color obtained is limited by that of the hydrous oxide used and the method has been of little utility except in the case of iron oxide because of the limited color ranges and low intensity possible. Attempts to modify the colors of the transparent finishes obtained by the aforementioned methods through the use of other transparent pigments or dyes have met with only limited success. Compositions modified in this way are in general lacking in durability and light-fastness or in transparency.

Guignet's Green, a transparent hydrated chromium oxide, prepared by fusing potassium dichromate with crystalline boric acid, yields attractive transparent coating compositions which can be metallized with, for example, aluminum flakes, to produce brilliant metallic finishes. The preparation of such finishes is, however, difficult owing to the poor dispersibility of the pigment. Also, little variation in the color range of the pigment is possible.

It is an object of this invention to produce a new line of transparent, durable, intensely colored pigments of relatively low tinting strength which are desirable for the formulation of metallic finishes. A further object is to make these products by an easily operable process from readily accessible raw materials. A further object is to produce transparent colored pigments in the blue to green color range which are readily dispersible in coating compositions containing conventional vehicles.

The objects of the invention are achieved by reacting hydrous metal oxides selected from the group of hydrous iron (III) oxide, hydrous chromium (III) oxide, and mixtures thereof, in the form of freshly precipitated aqueous slurries, with a mixture of a petroleum sulfonic acid salt and a copper phthalocyanine compound, flocculating the thus formed highly dispersed colored products by an organic cationic agent and isolating the flocculated material in conventional fashion by filtering, washing, and drying.

In a more specific and preferred embodiment, a freshly precipitated hydrous chromium (III) oxide is heated in aqueous slurry at an elevated temperature under slightly acidic conditions with a mixture formed by stirring together an alkali metal salt of an oil soluble petroleum sulfonic acid having an average molecular weight of between 350 and about 475 and a copper phthalocyanine compound. After heating the mixture for some time just below the boil, the highly dispersed suspension formed is flocculated by adding a solution of a minor amount of a cationic agent, preferably an organic base or a quaternary compound, such as a diphenylguanidine salt, and the product is isolated by filtering, washing, and drying. Preferred types of petroleum sulfonic acids and their salts for use in the process comprise the sulfonated petroleum derivatives obtained in the purification of petroleum products with sulfuric acid. Both water-soluble and oil-soluble products are formed in such processes and can be used herein, but the oil-soluble fractions, sometimes called mahogany acids, are preferred for employment, usually in the form of their sodium salts which are water-dispersible. Such products may be relatively pure or they may contain substantial amounts of unsulfonated mineral oil.

Alternatively, the hydrous chromium (III) oxide used in the foregoing preferred embodiment can be replaced in whole or in part with hydrous iron (III) oxide to produce a pigment which is yellower in hue than the corresponding one obtained as previously described with use of the chromium (III) oxide in the absence of any iron (III) oxide. Changes in the proportion of the hydrous oxides of trivalent iron and chromium can be used to vary the color, the hue becoming yellower with increasing proportion of iron oxide. The color may also be varied by change in the proportion of the copper phthalocyanine compound, relative to petroleum sulfonic acid, in the product. With increasing proportion of the copper phthalocyanine compound, the product becomes more strongly colored.

For a clearer understanding of the invention, the following specific examples are given. These examples are intended to be merely illustrative of the invention and not in limitation thereof. Unless otherwise specified, all parts are by weight.

EXAMPLE I 298 parts of sodium dichromate dihydrate $$(Na_2Cr_2O_7.2H_2O)$$

is dissolved in 1000 parts of water. To this solution is added 150 parts of sulfuric acid ($H_2SO_4$) and 312 parts of sodium hydrogen sulfite ($NaHSO_3$) dissolved in 1000 parts of water. The mixture is stirred for 1¼ hours. The solution is diluted with 12,000 parts of water and is then heated to 82° C. pH is adjusted to the range of 2.0–2.5 by the addition, as necessary, of sulfuric acid or sodium carbonate. To the diluted solution is added, over 30 minutes with stirring, 320 parts of sodium carbonate ($Na_2CO_3$) dissolved in 1600 parts of water. pH of the solution following sodium carbonate addition is in the range 8.0–8.5. The slurry is stirred for 30 minutes and then sulfuric acid is added to bring the pH to 4.0. 240 parts of a commercial sodium petroleum sulfonate containing about 52% of a sodium petroleum sulfonate with a molecular weight of about 415 (the remainder being mostly water) and an aqueous paste containing 60 parts of copper phthalocyanine monosulfonic acid are added with stirring and the mixture is heated to 88° C. and maintained at that temperature with stirring for two hours. 14.8 parts of diphenylguanidine, dissolved in a mixture of 296 parts of water and 28 parts of concentrated hydrochloric acid is then added and the slurry is filtered, and the precipitate is washed free of sulfate and dried at 60° C. 452 parts of a blue-green pigment is obtained which can be dispersed in a vehicle to yield an attractive blue-green coating composition of excellent durability except for some sensitivity to slight bleeding in contact with soap solutions.

EXAMPLE II

This example shows the effect of variation in the quantity of the monosulfonic acid of copper phthalocyanine in the process using hydrous chromium (III) oxide.

298 parts of sodium dichromate dihydrate

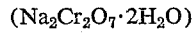

$(Na_2Cr_2O_7 \cdot 2H_2O)$ is dissolved in 1000 parts of water. To this solution is added 150 parts of sulfuric acid ($H_2SO_4$) and 312 parts of sodium hydrogen sulfite ($NaHSO_3$) dissolved in 1000 parts of water. The mixture is stirred for 1¼ hours. The solution is diluted with 12,000 parts of water and then heated to 82° C. The pH is adjusted to the range 2.0–2.5 by the addition, as necessary, of sulfuric acid or sodium carbonate. To the diluted solution is added, over 30 minutes with stirring, 320 parts of sodium carbonate ($Na_2CO_3$) dissolved in 1600 parts of water. The pH of the solution following the sodium carbonate addition is 8.0–8.5. The slurry is stirred for 30 minutes and then sulfuric acid is added to bring the pH to 4.0. 240 parts of sodium petroleum sulfonate containing about 50% of an oil soluble sodium petroleum sulfonate with an average molecular weight between 400 and about 475 (the remainder being mostly water) and an aqueous paste (approximately 20% solids) containing 100 parts (100% wt.) of copper phthalocyanine monosulfonic acid are added with stirring and the mixture is heated to 88° C. and maintained at that temperature with stirring for two hours. 14.8 parts of diphenylguanidine dissolved in a mixture of 296 parts of water and 28 parts of concentrated hydrochloric acid is then added and the slurry is filtered and the precipitate is washed free of sulfate and dried at 60° C. 490 parts of a blue-green pigment is obtained which can be dispersed in a vehicle to yield an attractive blue-green finish of excellent durability.

The product obtained is a pigment markedly bluer in hue than the product of Example I. Similarly, still greater blueness can be effected by further increasing in quantity of the copper phthalocyanine monosulfonic acid and, conversely, a less blue product is obtained with decrease in quantity of copper phthalocyanine monosulfonic acid.

EXAMPLE III

This example covers the use of mixtures of the hydrous oxides of iron and chromium in the process. 253 parts of sodium dichromate dihydrate ($Na_2Cr_2O_7 \cdot 2H_2O$) is dissolved in 850 parts of water. To this solution is added 128 parts of sulfuric acid ($H_2SO_4$) and 265 parts of sodium hydrogen sulfite ($NaHSO_3$) dissolved in 850 parts of water. The mixture is stirred for 1¼ hours then diluted with 14,000 parts of water, the diluted solution is heated to 82° C. and the pH is adjusted to the range 2.0–2.5 by the addition, as necessary, of sulfuric acid or sodium carbonate and 97.2 parts of iron (III) chloride ($FeCl_3$) is added and the mixture is stirred to solution. Approximately 440 parts of sodium carbonate ($Na_2CO_3$) dissolved in 2000 parts of water is then added with stirring over 30 minutes to a pH in the range of 8.0–8.5, and the slurry is then stirred for 30 minutes, after which the pH is adjusted to 4.0 by addition of sulfuric acid. 240 parts of a commercial sodium petroleum sulfonate with a molecular weight of about 415 (the remainder being mostly water) is then added with stirring to the hot precipitated hydrous oxide suspension, followed by an aqueous paste (about 20% solids) containing 60 parts (100% weight) of copper phthalocyanine monosulfonic acid. The mixture is then heated to 88° C. and stirred at that temperature for two hours, after which the dispersed particles in the suspension are flocculated by adding 14.8 parts of diphenylguanidine dissolved in a mixture of 296 parts of water and 28 parts of concentrated hydrochloric acid. The slurry is filtered and the precipitate is washed with water and dried at 60° C. Approximately 460 parts of a dry pigmentary product is obtained, which is much yellower in hue than the corresponding product made from use of hydrous chromium (III)) oxide in the absence of any iron (III) oxide. Similarly, additional replacement of chromium by iron in the process results in further shift in hue from blue towards the green.

EXAMPLE IV

*Use of Hydrous Iron Oxide Without Hydrous Chromium Oxide*

576 parts of ferrous sulfate ($FeSO_4 \cdot 7H_2O$) is dissolved in 2000 parts of water at room temperature to which is then added with stirring 104 parts of concentrated sulfuric acid and 40 parts of sodium chlorate ($NaClO_3$). The resulting mixture is heated to 82° C. with stirring and maintained at that temperature for approximately 30 minutes to oxidize the iron salt to the trivalent stage. To the solution of ferric sulfate thus formed, a solution of about 234 parts of caustic soda in about 1000 parts of water is added slowly over a period of about 20 minutes. The pH after this addition should be between 3.0 and 5.0, preferably about 4.0. Slightly more or less alkali may be added to result in the desired pH of about 4.0. 240 parts of a commercial sodium petroleum sulfonate product containing about 52% of a sodium petroleum sulfonate with a molecular weight of about 415 (the remainder being mostly water) is then added to the hot precipitated hydrous iron (III) oxide suspension, followed by 20 parts of copper phthalocyanine monosulfonic acid in the form of an aqueous paste containing 15% solids and pH is readjusted to approximately 4.0 by the addition of alkali or acid as necessary. The mixture is then heated to 88° C. with stirring, and maintained at that temperature for approximately two hours with stirring. The highly dispersed pigment suspension is flocculated by adding a solution of 14.8 parts of diphenylguanidine in 300 parts of water containing approximately 24 parts of concentrated hydrochloric acid (about 9 parts of 100% HCl). The pigment is isolated by filtering and washing and is then dried at about 60° C. and finally pulverized to give approximately 340 parts of a yellowish green powder. The product is readily dispersible in coating composition vehicles to give highly transparent, yellowish green finishes which, after the addition of flake aluminum, for instance, exhibit outstanding flash and brilliance. Such finishes show excellent gloss retention and durability on exposure to the elements and are substantially free from reactivity or progressive increase in viscosity on aging when formulated from conventional enamel or lacquer vehicles.

EXAMPLE V

*Effect of Increasing Quantity of Copper Phthalocyanine Monosulfonic Acid With Iron (III) Oxide*

Example IV is duplicated except that 40 parts of (100%) copper phthalocyanine monosulfonic acid (rather than the 20 parts of Example IV) is used with 240 parts of commercial sodium petroleum sulfonate product, which contains about 52% sodium petroleum sulfonate. About 360 parts of product is obtained with dispersibility, transparency and durability properties very similar to those of the product of Example IV, but with a considerably bluer hue than the product of Example IV. Similarly, an increase in the quantity of copper phthalocyanine monosulfonic acid to 60 parts (100% copper phthalocyanine monosulfonic acid) yields 384 parts of a still darker bluish-green pigment with dispersibility, durability, and transparency properties essentially the same as the product of Example IV.

EXAMPLE VI

*Effect of Variation of Quantity of Copper Phthalocyanine Monosulfonic Acid Using a Mixture of the Hydrous Oxides of Iron (III) and Chromium (III)*

253 parts of sodium dichromate dihydrate $$(Na_2Cr_2O_7 \cdot 2H_2O)$$

is dissolved in 850 parts of water. To this solution is added 128 parts of sulfuric acid ($H_2SO_4$) and 265 parts of sodium hydrogen sulfite ($NaHSO_3$) dissolved in 850 parts of water. The mixture is stirred for 1¼ hours then diluted with 14,000 parts of water, the diluted solution is heated to 82° C., and the pH is adjusted to the range 2.0–2.5 by the addition of sulfuric acid or sodium carbonate and 97.2 parts of iron (III) chloride ($FeCl_3$) is added and the mixture is stirred to solution. Approximately 440 parts of sodium carbonate ($Na_2CO_3$) dissolved in 2000 parts of water is then added with stirring over 30 minutes to a pH in the range 8.0–8.5, and the slurry is then stirred for 30 minutes, after which the pH is adjusted to 4.0 by addition of sulfuric acid. 240 parts of a commercial sodium petroleum sulfonate containing about 52% of a sodium petroleum sulfonate with a molecular weight of about 415 (the remainder being mostly water) is then added with stirring to the hot precipitated hydrous oxide suspension, followed by an aqueous paste (about 20% solids) containing 100 parts (100% weight) of copper phthalocyanine monosulfonic acid. The mixture is then heated to 88° C. and stirred at that temperature for two hours, after which the dispersed particles in the suspension are flocculated by adding 14.8 parts of diphenylguanidine dissolved in a mixture of 296 parts of water and 28 parts of concentrated hydrochloric acid. The slurry is filtered and the precipitate is washed with water and dried at 60° C. Approximately 500 parts of a dry pigmentary product is obtained. The product obtained is markedly bluer than the product of Example III. Similarly, further increase in blueness can be obtained with the use of more copper phthalocyanine monosulfonic acid and blueness is decreased with less of the copper phthalocyanine derivative.

EXAMPLE VII 298 parts of sodium dichromate ($NA_2Cr_2O_7 \cdot H_2O$) dissolved in 1000 parts of water is mixed with a solution of 150 parts sulfuric acid ($H_2SO_4$) and 312 parts sodium hydrogen sulfite ($NaHSO_3$) and stirred for 1¼ hours. It is then diluted with 12,000 parts of water and heated to 82° C. with the pH at 2.0–2.5. A solution of 320 parts of sodium carbonate ($Na_2CO_3$) in 1600 parts of water is added over 30 minutes with good agitation and, after 30 minutes' stirring, the pH is adjusted to 4.0. 240 parts of a commercial sodium petroleum sulfonate containing about 52% of a sodium petroleum sulfonate with a molecular weight of about 415 (the remainder being mostly water) is added followed by an aqueous paste containing 40 parts of a flocculation resistant copper phthalocyanine pigment containing both chlorine and sulfonic acid groups as substituents made, for instance, according to the teachings of U.S. 2,799,594 (Ehrich). The mixture is stirred at 88° C. for about 2 hours. A solution of 20 parts of an alkyl amine acetate (the alkyl groups having from about 14 to 18 carbon atoms) in 400 parts of water is added and stirring is continued for 15 minutes to flocculate the suspension. The pigment is isolated by filtering, washing free of soluble salts and drying at 600° C. to give an attractive greenish-blue pigment which exhibits excellent dispersibility in vehicles, and gives durable finishes which are free from any tendency to bleed in alkaline environments.

EXAMPLE VIII

The process of Example VII is repeated except that the phthalocyanine compound added is an aqueous paste containing 40 parts of a copper phthalocyanine in which about half of the molecules are substituted with one chlorine atom. The resulting product is a blue pigment which is considerably more red in hue than the product of Example VII but with otherwise similar properties.

By increasing the partially chlorinated copper phthalocyanine to 80 parts, a slightly redder and considerably stronger pigment results.

EXAMPLE IX

The process of Example VII is repeated except that the phthalocyanine compound added is an aqueous paste containing 40 parts of a green-shade, chlorine-free copper phthalocyanine (beta crystal phase). The resulting product is a greenish-blue pigment which is readily dispersible in a vehicle, shows good strength and excellent durability and exhibits no tendency to bleed in alkaline environments.

By increasing the green-shade copper phthalocyanine to 80 parts a considerably stronger pigment is obtained.

EXAMPLE X

The process of Example VII is repeated except that the phthalocyanine compound added is an aqueous paste containing 60 parts of polychloro-copper phthalocyanine containing 14 to 15 chlorine atoms per molecule. The resulting dry pigment is a greenish powder which is readily dispersible in a coating composition vehicle to give greenish compositions of good strength and excellent durability which are free of any tendency to bleed in alkaline environment such as in soap solutions.

The valuable properties of the pigments of this invention can be best demonstrated by formulating the pigments in coating compositions of which the formulations given in the following Examples XI, XII and XIII are typical but not limiting.

EXAMPLE XI

The present example illustrates the formulation in a typical modified alkyd enamel coating composition comprising the following ingredients:

| | Parts by weight |
|---|---|
| Pigmentary product of Example I | 30 |
| Short oil alkyd resin (50% solution) | 216 |
| Modified melamine formaldehyde resin (60% solution) | 20 |
| Aromatic hydrocarbon solvent | 40 |
| Aliphatic hydrocarbon solvent | 40 |
| Manganese naphthenate drier (6% solution) | 0.2 |
| Aluminum paste (80% solids) | 2 |
| | 348.2 |

This enamel can be prepared by any customary paint grinding technique, as by grinding the pigment in a ball mill with a portion of the alkyd resin and thinners, after which the remainder of the ingredients can be added and stirring to complete homogeneity. A highly transparent green enamel is obtained which, when used as a coating composition, exhibits very desirable metallic "flash" and has excellent durability when exposed to the elements.

The pigmentary products of other examples can be dispersed in the alkyd coating compositions in like fashion to yield similar results. The coatings obtained vary in color with the color of the pigment, and in all cases show excellent durability and attractive metallic "flash."

EXAMPLE XII

A typical acrylic lacquer, using the new pigment of this invention, can be made up of the following ingredients:

| | Parts by weight |
|---|---|
| Pigment of this invention | 2.5 |
| Mixed acrylic ester polymer | 17.9 |
| Butyl benzyl phthalate | 7.7 |
| Monoacetate of ethylene glycol monoethyl ether | 20.0 |
| Methyl ethyl ketone | 56.9 |
| Toluene | 50.0 |
| | 155.0 |

The pigment is dispersed in the combined mixed acrylic ester polymer and butyl benzyl phthalate with sufficient of the solvents to permit grinding the mixture in a ball mill. After milling, the remaining ingredients are incorporated by simple agitation. A metallized lacquer is prepared from the above lacquer by adding thereto sufficient flake aluminum to give 10 parts of aluminum to 90 parts of the pigment of the invention. The metallized lacquer exhibits a prominent metallic flash and an attractive pale color in the blue-green color range.

EXAMPLE XIII

A typical nitrocellulose lacquer, using the new pigment of this invention can be made up of the following ingredients:

| | Parts by weight |
|---|---|
| Pigment of this invention | 3.5 |
| Cellulose nitrate ½ second viscosity | 15.4 |
| Non-drying alkyd resin (60% solution) | 7.1 |
| Dibutyl phthalate | 2.5 |
| Castor oil | 2.5 |
| Active solvents | 33.0 |
| Alcohols | 17.8 |
| Aromatic hydrocarbon | 18.2 |
| | 100.0 |

A common method of preparing such a lacquer is to disperse the pigment in the resin-plasticizer portion of the composition together with sufficient solvent to permit working the mass in a ball mill or other grinding device. The remaining ingredients are then incorporated by simple agitation. The dispersion of the pigment may also be done in other ways known for the preparation of nitrocellulose lacquers such as by plastic milling on a 2-roll mill or by flushing from an aqueous paste of the pigment as for instance in U.S. 2,140,745.

A metallized lacquer prepared from the lacquer by the method of Example XII shows substantially the same attractive metallic flash and color as the lacquer of Example XII.

The copper phthalocyanine compounds used for the purposes of this invention include copper phthalocyanine itself, in either the red-shade alpha phase or the green-shade beta phase (see Example IX for the use of the betal phase), and various substituted derivatives such as copper phthalocyanine monosulfonic acid (see Examples I to III), partially chlorinated copper phthalocyanine (see Example VIII), substantially fully chlorinated copper phthalocyanine (see Example X) as well as various mixtures of these ingredients. From a chemical point of view, the use of copper phthalocyanine monosulfonic acid is particularly advantageous since the sulfonic acid group enables it to join with the petroleum sulfonic acid in the intimate association with the hydrous metal oxide. Products so obtained exhibit a very desirable transparency and brilliance of hue accompanied by a high degree of dispersibility in coating compositions. Unfortunately, however, compositions containing these products have shown some sensitivity to certain alkaline environments, notably to soap solutions, which has limited their use. It is most surprising, therefore, to find that the sulfonic acid group in the phthalocyanine compound is not necessary for either transparency or dispersibility when the compound is added prior to the flocculation of the petroleum sulfonic acid. Moreover, such use of unsulfonated phthalocyanine compounds affords a wider range of hues available, from the bright green shade of the polychloro copper phthalocyanine to the reddish-blue of the alpha phase copper phthalocyanine.

A preferred group of copper phthalocyanine compounds for the purposes of this invention is the group embracing the compounds of the formula

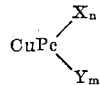

and mixtures thereof, in which Formula X is halogen (such as F, Cl or Br), Y is $SO_3H$, $n$ has a value from 0 to 15, inclusive, and $m$ has a value from 0 to 1, inclusive, while CuPc represents the fundamental nucleus of copper phthalocyanine, that is the radical whose empirical formula is $CuN_8C_{32}H_{16-(m+n)}$.

The petroleum sulfonic acids used in this invention are alkali metal (sodium, ammonium, potassium, lithium) salts of sulfur-containing acid groups attached to hydrocarbon radicals of from about 16 to 28 carbon atoms; or the corresponding free acids. The acid group is attached to the hydrocarbon radical through a carbon-sulfur bond and the petroleum sulfonic acid has the general formula $R-SO_3H$. The preferred agents are the type in which the hydrocarbon radical comprises a long chain aliphatic radical, which may be unsaturated, attached to an aromatic-naphthenic nucleus with a sulfonate group attached to the aromatic portion of the molecule. The empirical formula of the sodium salt is $C_nH_{2n-10}SO_3Na$ where $n$ may vary from about 16 to 28 and the molecular weight is in the range of about 350–475. Typical of such preferred agents are the sodium salts of the so-called mahogany acids which comprise the oil soluble fraction resulting as by-products from the purification of petroleum oils with sulfuric acid. Such products are often given the generic name of sodium petroleum sulfonate and are usually available dispersed in more or less water as liquid liquid products. Some commercial forms also contain substantial amounts of mineral oil (up to 35%) and these are also successfully used in this invention, but are less desirable.

Many variations in preparation of the hydrous oxides of iron and chromium are possible without departure from the invention. The use of various additives to change the color of the hydrous oxide, control of particle size, etc., are well known in the art and are applicable to the present invention. The iron salt solution and the chromium salt solution from which the hydrous oxides are precipitated can be prepared in any convenient manner and methods for their preparation will be obvious to those skilled in the art.

The precipitation of the hydrous oxide may take place under a variety of conditions. Although the use of sodium carbonate ($NA_2CO_3$) is generally preferred because of low cost, other alkaline agents such as sodium hydroxide or ammonium hydroxide can also be used and may actually be preferred under some conditions. It is already known in the art that variations in the alkali used, the pH of precipitation, and the addition of small amounts of other metallic salts may be employed to control the color of precipitated hydrous ferric oxides and precipitated hydrous chromic oxides and these same points of control will be apparent to those skilled in the art since, to a very large extent, the hue of the resulting pigment is influenced at the point of precipitation. The examples have shown the addition of the alkaline agent to the iron salt, but the reverse procedure in which the iron or chromium salt is added to the alkaline agent may also be used and may be preferred under some conditions. In general, the pH after precipitation is in the range of 4–6 for hydrous iron (III) oxide and 8–9 for hydrous chromium (III) oxide or mixtures of chromium (III) and iron (III) oxides. The normally preferred points are pH of 4.5 for hydrous iron (III) oxide and 8.3 for the hydrous chromium (III) oxide or mixtures of the two. However, considerable variation in pH, including precipitation of the iron to a pH on the alkaline side and the chromium on the acid side yield acceptable results and it is not meant to exclude such operations.

It is essential that the petroleum sulfonic acid salt and the copper phthalocyanine compound be present together during the reaction with the hydrous oxide. Prolonged delay in the addition of either the petroleum sulfonic acid salt or the copper phthalocyanine compound results in products which are markedly different in composition and color and inferior in exterior durability compared to the product made according to the process of the invention. It is also essential that the hot digestion reaction between the hydrous oxide and the sulfonated compounds be carried out under acidic conditions. Attempts to conduct the reaction under alkaline conditions lead to an inferior product quite different from the one desired. The operable pH range is about 3.0–6.0 and the preferred range is about 3.5–4.5. The amount of water used to form the aqueous slurry is not at all critical. Of course, there should be a sufficient quantity so that the slurry can be easily kept in a state of agitation during the heating step. It is preferred to use dilute slurries. For example, it is common practice to use slurries in which the solids constitute 5–10% by weight of the slurry.

The hot digestion is carried out at a temperature of at least 75° C. and a duration of at least one hour and up to about 3 hours. Longer times can also be used, if desired. The preferred temperature is about 85–90° C., held for about two hours. With lower temperatures, the time required will increase somewhat, but higher temperatures, including boiling, though utilizable, do not result in any specific reduction in the time requirement and hence are uneconomical for use.

After the digestion, the product is very highly dispersed in the aqueous slurry and can be isolated only with great difficulty, if, at all. In order to flocculate it, a solution of a salt of flocculating agent such as diphenylguanidine is added. This reacts with and becomes an essential part of the resulting product which is then readily isolated by filtering, washing free of soluble salts, and drying. The type of flocculating agent required for this operation is believed to be somewhat critical. It must be an agent with a high molecular weight organic cation, preferably an organic nitrogen base such as an amine or a quaternary ammonium compound. In addition to diphenylguanidine, one may use other guanidine derivatives, long chain amines such as lauryl amine, stearyl amine, and the like or quaternary salts such as lauryl trimethyl ammonium chloride and similar compounds with various hydrocarbon radicals. Many such amines and quaternary compounds are derived from natural fats and comprise mixtures of various chain lengths rather than pure compounds. The amines, such as diphenylguanidine, or lauryl amine, are soluble only as their salts in dilute acid and require such solution for effective use. The quaternary compounds are generally water soluble or dispersible and may be dissolved directly for use.

The amount of flocculating cationic agent needed is relatively small and is in the range of about 10–15% of the weight of the petroleum sulfonic acid or salt used. All of the examples use about 12% of the flocculating agent based on the weight of the sulfonic acid derivative. Amounts less than about 10% may not give complete flocculation while amounts substantially in excess of about 30% offer no added advantage and the excess is simply washed out and lost. Hence, the use of amounts ranging from about 10 to 30% usually suffice for most practical purposes.

The amount of petroleum sulfonic acid or salt used may vary from about 0.05 mol to 0.3 mol per atom of metal with a preferred amount in the range of about 0.15 mol to 0.2 mol per atom of metal in the hydrous metal oxide. Examples I, II, IV and V use 0.15 mol of sodium sulfonate per atom of metal in the oxide. Examples III and VI use 0.13 mol per atom of metal. All examples are in this range.

The copper phthalocyanine compound used is substantialy less than the petroleum sulfonic acid, varying from about 0.01 mol to about 0.1 mol per atom of metal with the preferred usage in the range of about 0.015 mol to 0.05 mol per atom of metal in the hydrous metal oxide. The mols of copper phthalocyanine compound per atom of metal used in some of the examples are as follows:

| Example | mol |
|---|---|
| Example I | 0.046 |
| Example II | 0.076 |
| Example III | 0.039 |
| Example IV | 0.015 |
| Example V | 0.030 and 0.046 |
| Example VI | 0.066 |
| Example VII | 0.035 |
| Example VIII | 0.035 and 0.070 |
| Example IX | 0.035 and 0.070 |
| Example X | 0.028 |

The above specified range of proportions for the various ingredients used in the process of this invention are also applicable to the pigment product which is obtained since yields are substantially quantitative.

Whether the products of this invention comprise true chemical compounds or are hydrous metal oxides in which the surface of the amorphous particle has been modified by the presence of adsorbed petroleum sulfonate and copper phthalocyanine compound cannot be stated with certainty. It is clear, however, that they are not simple mixtures because the desired results cannot be obtained by simple admixture of the several components either in slurry form at room temperature or by the addition of the agents to any dry form of an untreated metal hydrate nor by including the separate components together in the preparation of a paint or other coating. It is generally accepted that many hydrous metal oxides exist in the form of polymeric chains of several repeating $$-\underset{\underset{OH}{|}}{M}-O-$$

groups. The free —OH groups probably react under proper conditions with salt forming groups without breaking the polymeric chain. The evidence seems to favor the concept of such compound formation in the products of this invention. Such compounds appear to contain statistically about one sulfonate radical for 4 to 5 atoms of iron or chromium there being statistically approximately one mol of copper phthalocyanine compound for each 6 or 7 petroleum sulfonate radicals. These products are "soluble" or at least very highly dispersible, in organic solvents. They show a Tyndall cone in such dispersions and they show some freezing point depression which approximates in order of magnitude that to be expected from such compounds. Whether compound formation, surface treating effects or both are involved, it is clear that the products of this invention involve some intimate association of the hydrous metal oxides with the combination of petroleum sulfonic acid and copper phthalocyanine compound which is further improved by the presence of the cationic agent and which cannot be achieved by any simple mixture of the ingredients.

The products of the invention make available to the paint formulator durable, highly transparent, colored pigments of excellent color saturation in the blue-green color range, which are readily dispersible and compatible with conventional paint vehicles. The products have the following advantages relative to prior art pigments:

(1) Greater ease of dispersion than corresponding pigments in this color range.

(2) A combination of excellent durability, transparency, and color saturation not hitherto available in the blue-green color range. These properties are highly desirable for metallic finishes.

(3) Possibility of wide variation in color within the indicated range without sacrifice of other desirable properties.

Since it is obvious that many changes and modifications can be made in the above-described details without departing from the nature and spirit of the invention, it is to be understood that the invention is not to be limited to said details except as set forth in the appended claims.

I claim as my invention:

1. A process for preparing a modified hydrous metal oxide pigment which comprises heating for at least one hour, at a temperature of at least 75° C. and at a pH of about 3 to 6, a precipitated hydrous metal oxide from the group consisting of hydrous chromium (III) oxide, hydrous iron (III) oxide and combinations thereof in an aqueous slurry with a copper phthalocyanine compound and a sulfonic acid derivative selected from the group consisting of petroleum sulfonic acids and the ammonium and alkali metal salts thereof, flocculating the solid material in said aqueous slurry by the addition of a flocculating agent and recovering a modified hydrous metal oxide pigment.

2. The process of claim 1 wherein the heating is conducted at a temperature of about 85–90° C.

3. The process of claim 1 wherein the metal oxide is hydrous chromium (II) oxide.

4. The process of claim 1 wherein the metal oxide is hydrous iron (III) oxide.

5. A modified hydrous metal oxide pigment consisting essentially of an intimate association of (1) a metal oxide from the group consisting of hydrous chromium (III) oxide, hydrous iron (III) oxide and combinations thereof, (2) a petroleum sulfonic acid derivative from the group consisting of petroleum sulfonic acids and the ammonium and alkali metal salts thereof, (3) a copper phthalocyanine compound and (4) an organic nitrogen base, cation-active flocculating agent, said petroleum sulfonic acid derivative being present in an amount of about 0.05–0.3 mol. per atom of metal in the hydrous metal oxide, said copper phthalocyanine compound being present in an amount of about 0.01–0.1 mol. per atom of metal in said hydrous oxide and said flocculating agent being present in an amount of 10–30% of the weight of the petroleum sulfonic acid derivative.

6. The pigment of claim 5 in which the petroleum sulfonic acid derivative is present in an amount of 0.15–0.2 mol per atom of metal in the hydrous metal oxide, and the copper phthalocyanine compound is present in an amount of 0.015–0.05 mol per atom of metal in said hydrous oxide, and the amount of flocculating agent is 10–15% of the weight of the petroleum sulfonic acid derivative.

7. The pigment of claim 6 in which the metal oxide is hydrous chromium (III) oxide.

8. The pigment of claim 6 in which the metal oxide is hydrous iron (III) oxide.

9. The pigment of claim 6 in which the flocculating agent is diphenylguanidine.

10. A pigment as in claim 5, wherein said copper phthalocyanine compound is a compound of the formula

wherein X is halogen, Y is $SO_3H$, $n$ has a value from 9 to 15, $m$ has a value from 0 to 1, while CuPc represents the fundamental copper phthalocyanine radical less $(m+n)$ H-atoms.

11. A modified hydrous metal oxide pigment consisting essentially of an intimate association of hydrous chromium (III) oxide, sodium petroleum sulfonate, copper phthalocyanine and a nitrogen-base, cation-active flocculating agent, said sodium petroleum sulfonate being present in an amount of about 0.15 mol per atom of chromium, copper phthalocyanine being present in an amount of 0.035 mol per atom of chromium, and the amount of said flocculating agent being about 16% of the weight of the sodium petroleum sulfonate.

12. A modified hydrous metal oxide pigment consisting essentially of an intimate association of hydrous chromium (III) oxide, sodium petroleum sulfonate, polychloro copper phthalocyanine and a nitrogen-base, cation-active flocculating agent, said sodium petroleum sulfonate being present in an amount of about 0.15 mol per atom of chromium, polychloro copper phthalocyanine being present in an amount of 0.028 mol per atom of chromium, and the amount of said flocculating agent being about 16% of the weight of the sodium petroleum sulfonate.

13. A modified hydrous metal oxide pigment consisting essentially of an intimate association of hydrous chromium (III) oxide, sodium petroleum sulfonate, copper phthalocyanine monosulfonic acid and diphenylguanidine, said sodium petroleum sulfonate being present in an amount of about 0.15 mol per atom of chromium, said copper phthalocyanine monosulfonic acid being present in an amount of 0.046 mol per atom of chromium, and the amount of diphenylguanidine being about 12% of the weight of the sodium petroleum sulfonate.

References Cited in the file of this patent

UNITED STATES PATENTS

| | | |
|---|---|---|
| 2,445,770 | Fischer | July 27, 1948 |
| 2,575,347 | Kumins et al. | Nov. 20, 1951 |
| 2,818,348 | Jackson | Dec. 31, 1957 |
| 2,879,246 | Jackson | Mar. 24, 1959 |

UNITED STATES PATENT OFFICE
CERTIFICATE OF CORRECTION

Patent No. 3,136,648                          June 9, 1964

Julius Jackson

It is hereby certified that error appears in the above numbered patent requiring correction and that the said Letters Patent should read as corrected below.

Column 12, lines 11 to 14, the formula should appear as shown below instead of as in the patent:

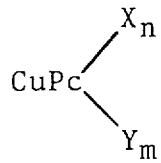

Signed and sealed this 20th day of October 1964.

(SEAL)
Attest:

ERNEST W. SWIDER                                    EDWARD J. BRENNER
Attesting Officer                                     Commissioner of Patents